United States Patent [19]

Edgar et al.

[11] Patent Number: 5,355,057
[45] Date of Patent: Oct. 11, 1994

[54] TELECINE CHAINS

[75] Inventors: David R. Edgar; Tony Corcoran; Ian G. Small, all of South Melbourne, Australia

[73] Assignee: Syme Electronic Communications Pty. Limited, South Melbourne, Australia

[21] Appl. No.: 85,548

[22] Filed: Jun. 30, 1993

Related U.S. Application Data

[60] Division of Ser. No. 58,488, May 5, 1993, which is a continuation of Ser. No. 743,116, Aug. 9, 1991, abandoned.

[30] Foreign Application Priority Data

Aug. 9, 1990 [AU] Australia ............... PK1630/90

[51] Int. Cl.$^5$ ................. G09G 1/04; H04N 3/36
[52] U.S. Cl. ..................... 315/370; 348/97; 348/106
[58] Field of Search ............. 315/382, 370; 358/214, 358/216; 348/97, 106

[56] References Cited

U.S. PATENT DOCUMENTS 4,191,972  3/1980  Matchell ................ 358/214
4,881,125 11/1989  Krause ................. 358/216

*Primary Examiner*—Gregory C. Issing
*Attorney, Agent, or Firm*—Edwin D. Schindler

[57] ABSTRACT

In a telecine chain, means including a rotate coil located about the scanning tube to apply a magnetic field perpendicular to the axis of the electron beam to thereby effect rotation of the raster, the degree of rotation depending on the amount of current flow and the direction of the flow and means to compensate for the distortion introduced by the rotation. The types of distortion for which compensation can be provided include rotate, focus, size, height and rhombic distortions.

5 Claims, 4 Drawing Sheets

TELECINE CHAINS

This application is a division of application Ser. No. 08/058,488, filed May 5, 1993, which is continuation of application Ser. No. 07/743,116, filed Aug. 9, 1991, now abandoned.

This invention relates to improvements in telecine chains.

Telecine chains have been used for many years to transfer optical film to video tape and are well known in the art.

Whilst such devices are very sophisticated and can effectively transfer the images from film to video tape many units are at least restricted in the modifications to the image that can be made whilst the transfer is occurring.

Possibly the areas where this is of greatest importance are firstly in relocating the image by rotation, the second is jitter when there is a panning of the image either vertically or horizontally, the third focus control, the fourth aspect ratio variation and the fifth generating geometric ripple effects.

The first of these difficulties occurs where the original film has the image wrongly angularly located and it would be desirable to effect rotation, at least to a certain extent.

The fourth is exacerbated where there has to be a selective copying of the image, to change from different aspect ratios and where, when the original image is cropped the orientation is not aesthetically satisfactory. A second area of difficulty It is the principal object of the present invention to provide, in a telecine chain, means whereby these and other undesirable characteristics can be minimised or overcome.

The invention in its broadest sense comprises means to rotate the scanning raster by applying a magnetic field perpendicular to the axis of the electron beam to thereby effect rotation of the raster, and providing means whereby the distortion introduced by such rotation can be compensated.

The compensation can be to focus by applying a stimulus to the focus system which is based on the degree of rotation being effected, size, which can be overcome by applying an input to the zoom system which is based on the degree of rotation, rhombic distortion which can be overcome by applying a frame rate ramp to the horizontal scan and height which must be modified in proportion to the rotate angle.

The invention also includes a telecine chain having a coil located about the scanning tube.

In order that the invention may be more readily understood we shall describe, in general terms, the operation of the device of the invention and the electronics will be indicated in the attached block diagrams, in which.

We provide, about the tube which generates the raster, a circular coil which is preferably located directly behind the pin cushion correction coils at the face plate end of the tube cradle.

By passing current through this coil we can cause rotation of the raster and the degree of rotation is dependent upon the amount of current flowing in the coil and the direction of rotation depends upon the direction of the current flow.

We provide a coil which, with designed current flows can cause rotation of the raster by up to $+-45°$.

It will be appreciated that in normal circumstances, for example where correction to an image is required, the degree of rotation required is normally of the order of only a few degrees but in some extreme cases, and for special effects, a higher rotation or angle will be required.

Simple rotation of the raster itself would, of course, lead to a distorted image and in the invention we provide means whereby five different areas of distortion, rotate, focus, size, height and rhombic, can be the subject of compensation.

ROTATE

Figure 1:
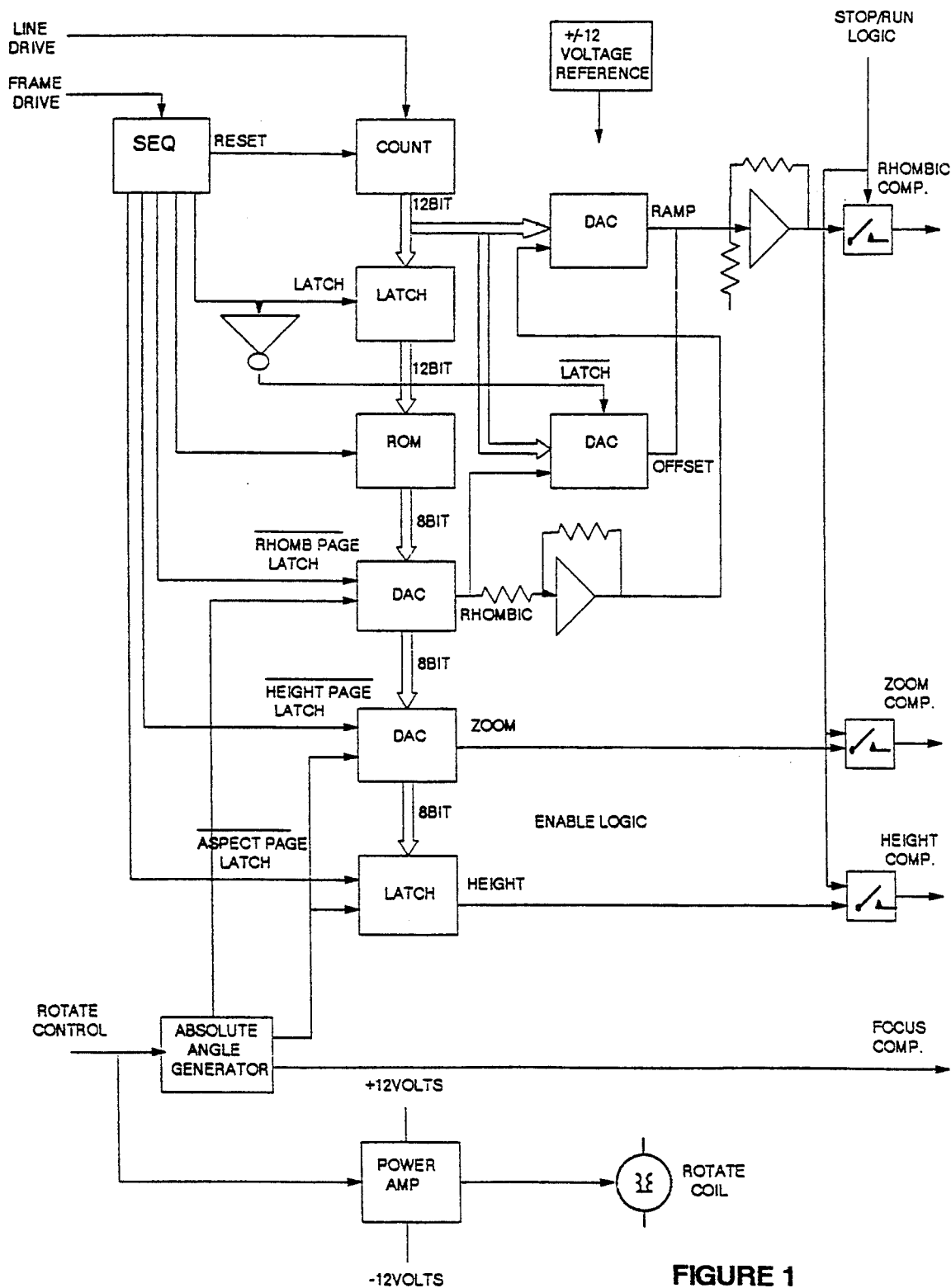
FIG. 1 is a block diagram of the rotate circuitry of the invention.

Referring first to FIG. 1, we show a block diagram of the arrangement used by the invention. As described above, the rotate coil is located behind the pin cushion correction coils and this is shown at the bottom right of the diagram.

The Rotate Control provides a signal which controls the Power Amp to provide a current to the Rotate Coil, the direction and the degree of current flow directly effecting the direction and angle of rotation of the raster.

The Rotate Control is also fed to an Absolute Angle Generator which directly provides the Focus Compensation and also provides outputs to the digital to analogue converters which provide the modification for Aspect and Zoom compensation and to a further converter which provides means whereby the Rhombic compensation is provided.

These are also modified by the Line Drive and the Frame Drive to compensate for 525/625 lines per inch operation and variable speed operation.

The outputs from the circuitry of FIG. 1 are shown as Focus Compensation, Aspect Compensation, Zoom Compensation and Rhombic Compensation, each of which will be described hereafter.

It can also be seen from FIG. 1 that logic circuits are provided in the Rhombic, Zoom and Aspect compensatory circuits to provide different compensation for the stop and run conditions as will be discussed hereinafter.

In the preferred form of the invention, when used with a standard telecine chain, we prefer to provide rotate speeds as follows:

PAL—16, 18, 24, 25 and 30 fps

NTSC—16, 18, 24 and 30 fps; and rotation range between $+45°$ and $-45°$.

In this specification, where we refer to ranges, it is to be appreciated that these are preferred, but not absolute, ranges.

FOCUS

The Rotate Coil is located between the face plate and the focus coil of the tube and, as the Focus Coil and the Rotate Coil of the invention create magnetic fields in the same plane, so they interact with each other. The normal rotate effect of the Focus Coil is compensated for in a telecine chain by the rotation of the X-Y Scan Coils when the tube is initially set-up.

The normal rotate effect of the Focus Coil is slight because it is displaced further from the face plate than the Rotate Coil of the invention and, further, it is behind the X-Y Scan Coils.

Figure 2:
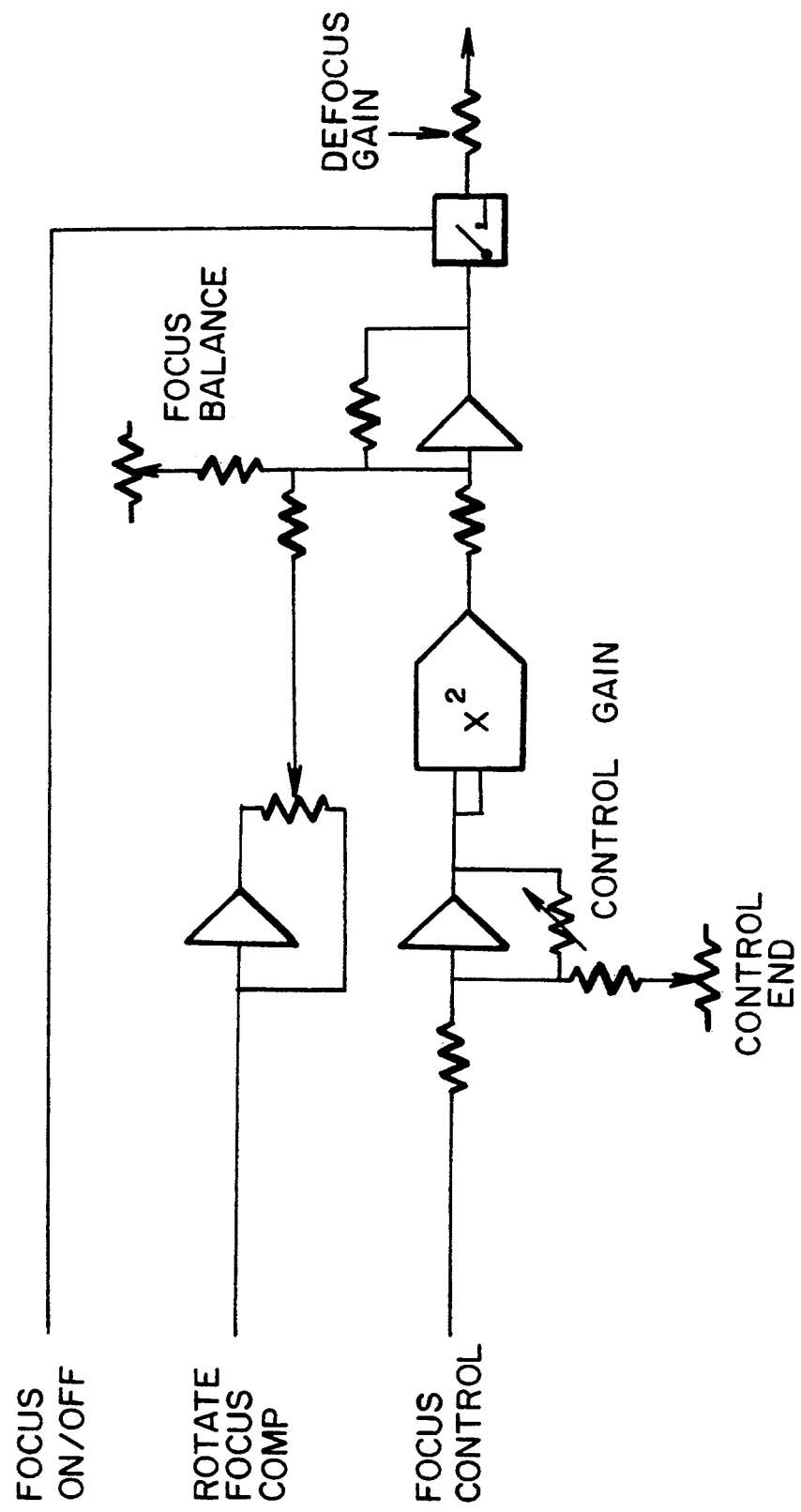
FIG. 2 is a block diagram of the Focus block of the circuit.
Figure 3:
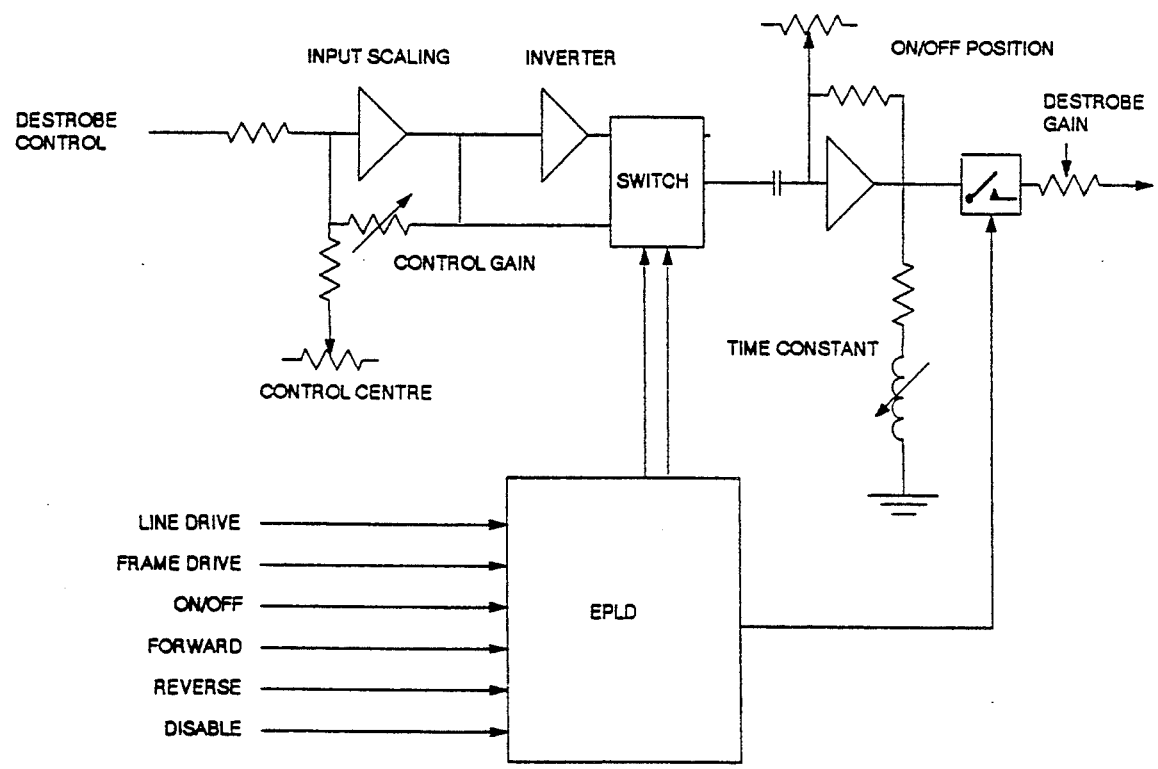
FIG. 3 is a block diagram of the De-Strobe block of the circuit.

As shown in FIG. 2, we apply to the Focus Coil an additional current which developed by the Absolute Angle Generator of FIG. 1 and which is a fraction of the current passed through the rotate coil. This current, whilst normally generated automatically can be adjusted by an operator by means of the Focus Control.

We also include linearity compensation for operator focus control, because the focus control stimulus versus actual perceived focus change, has a non-linear relationship.

The linearity compensation is achieved by squaring the control stimulus.

This circuit provides means to effect de-focus.

De-focus is used to deliberately pull a scene into or out of focus to provide a required effect.

In the device of the invention, this is achieved by modifying the reference voltage on the focus current regulator on the focus board.

The arrangement uses an analogue multiplier which is connected as a squaring circuit to modify the control linearity so that, where the focus position is reached, there is no modification to the reference voltage but as the focus is moved from this position there is very fine control initially but, as the picture loses focus, the control becomes coarse.

SIZE

As the raster is rotated we found that the size of the image decreases irrespective of the direction of rotation.

We believe that the presence of the field from the Rotate Coil reduces the effective X-Y scan gains of the scanning system.

The change in size is the same for both the X and the Y axes so there is no distortion introduced as far as aspect ratio is concerned.

Figure 4:
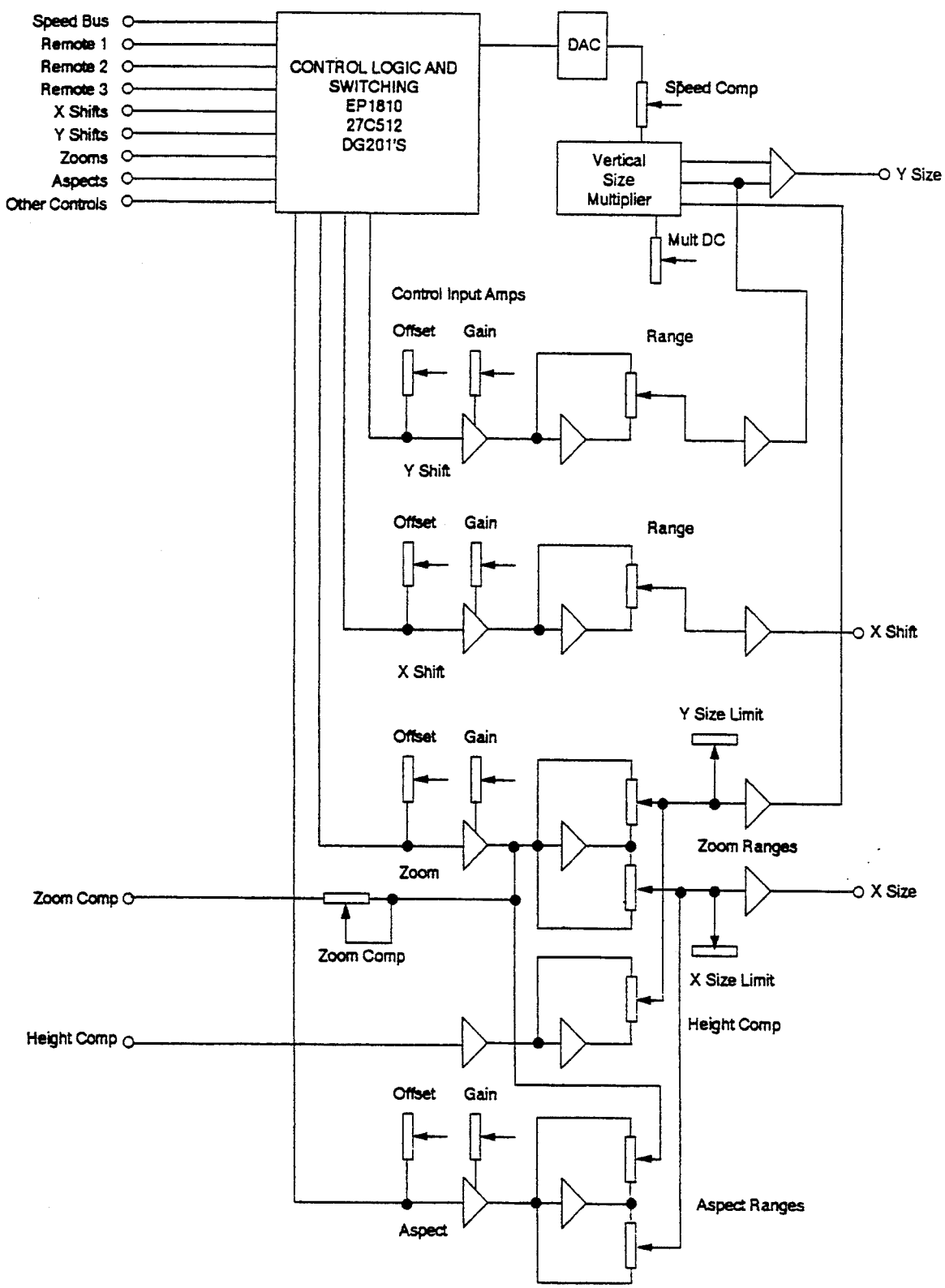
FIG. 4 is a block diagram of the Zoom/Aspect Ratio compensation circuitry of the invention.

The change in the size can be compensated by applying a fraction of the rotate stimulus to the zoom system so that the required size is achieved. The block diagram of FIG. 4 shows the Zoom Compensation signal from the Rotate Control of FIG. 1.

RHOMBIC DISTORTION

It will be appreciated that as the raster is rotated away from normal the interaction of film velocity and scan occurs in the horizontal scan system as well as in the vertical, as discussed above, so the aspect ratio, 4:3, of the raster is varied and the raster becomes rhombic in shape and there is a geometric distortion.

To overcome this distortion we apply to the horizontal scan some frame rate ramp which is proportioned to the angle of rotation and which is of a value sufficient to compensate for the distortion. This is demonstrated in the block diagram of FIG. 1.

DE-STROBE (JITTER)

A further problem we have addressed is the annoying jitter which occurs when large areas of the film image move together in one direction at the same speed.

The most widely used television systems in use today incorporate a technique called interlaced scanning. This process effectively increases the system "frame" rate for a given system signal band width. This is a great advantage when electronic cameras are used, e.g. for a 2:1 interlaced system the effective frame rate is doubled, by creating two fields for each frame. This results in a reduction in frame rate flicker also, fields can be duplicated to generate slow motion pictures because each field is slightly different from all other fields when the subject is moving.

However, in telecine this is a disadvantage because the two fields in each frame are almost identical because they were both generated from the same "snapshot" of the subject. This means that the motion tends to step between snapshots so if we think of the field rate "shots" every group of two fields is identical and when we step to the next group, an inter-field interlace error occurs. This results in a frame rate jitter.

The theory used to provide de-strobe is to average out these interlace errors so that they occur between every field and the identical field grouping doesn't occur.

For simplicity, we will consider only 25 frame PAL and 30 frame NTSC.

Telecines scan the film sequentially. So in speed settings which result in 2:1 pull down i.e. 25 fps PAL and 30 fps NTSC, each film frame is scanned only once. The odd even line fields are generated by manipulation in the store control.

This is where the two identical fields are generated.

To average out the frame rate inter-field jitter, we decrease the error between groups of fields and increase the error between fields in the groups.

Two possible methods of correction are proposed.

For horizontal de-strobe one possibility is to wobble store clock timing. Whilst vertical axis correction can be applied this is very complicated as store addressing has to wobble.

A preferred way is to manipulate the raster lines.

Looking at the sequential theory of telecines, if one field is made up of all the even lines, then the other field is made up of the odd lines. So, by using a half line rate square wave signal, we can control the odd and even groups of lines independently.

This is the way de-strobe is achieved. Two bipolar (about 0 Volts) half line rate square wave signals are used. One for horizontal interlace control, and the other for vertical interlace control. Both these signals are effectively four quadrant multiplied by each control stimulus, both controls are also bipolar.

The two controls are:
1. X de-strobe
2. Y de-strobe

This gives control of direction and amount of correction for X and Y axes.

For diagonal motion, a portion of both X and Y control stimulus is required.

It is preferred that in a practical system, the de-strobe ranges are as follows:
1. X de-strobe $+/-5$ uS
2. Y de-strobe $+/-16$ lines

HEIGHT

When the raster is rotated away from normal, the height component increases and for compensation this is decreased in proportion to the rotate angle.

This is introduced because of the change in the resolution of the components to the vertical and horizontal on rotation.

The height compensation is illustrated in FIG. 1 in which an input derived from the Absolute Angle Generator is applied to the Y-Size circuitry.

The change due to complementary scanning because of the vertical movement of the film complements the vertical scan and this is normally corrected for by the system. On a stop condition, this correction is not required and we provide logic to remove the correction on stop.

The change in height is also different during stop and run. The reason for this is that when the chain is running the film runs continually through the gate and does not stop as is the case when it is projected and the film vertical movement and the vertical scan interact.

ASPECT RATIO VARIATION

The system also provides a means whereby the aspect ratio of a picture can be modified.

This is useful in two areas. The first is where the original movie film uses an aspect ration which is non-standard for television such as, for example, a Cinemascope (Trade Mark) format.

When such films are converted to video tape a compromise has to be made between clipping one or both edges of the film, to provide the required aspect ratio, or reducing the height.

Where, for example, credits are to be shown, it is often necessary to reduce the height so that the total width of the film can be displayed but in the body of the film often selected portions of the total image are used with the full height of the video image being maintained as the height of the film, and information from the film is clipped from both or either side of the film.

In the invention the aspect ratio adds an additional control to the X-Y zoom system.

The zoom stimulus is a signal which varies from zero to a maximum voltage and it is normally derived from the grading control system or elsewhere in the unit.

The signal is buffered and split into two identical signals, one of which controls the height of the picture and the other the width.

In order to vary the aspect ratio it is necessary to vary these signals so they are no longer identical and this will change the aspect ratio without varying the general operation of the zoom.

We prefer to achieve this by the use of the aspect control as an off-set to these two identical signals.

This is achieved by the use of two summing amplifiers and wherein the height control is derived by adding the zoom stimulus by the aspect ratio stimulus and the width control is derived by multiplying the zoom stimulus by the inverse of the aspect ratio stimulus.

The circuits are identical and in this way we can provide a changed aspect ratio which is fully acceptable in operation.

It is preferred that the aspect ration range, measured at normal size, is from half height and twice width to twice height to half width.

For zoom, it is desired that, with normal aspect ratio, the range is 8:1

X Shift +/− half picture width at normal size; and

Y Shift +/− half picture height at normal size.

I claim:

1. A telecine chain in which optical film is continuously scanned, said telecine chain comprising:
   de-strobe compensation being effected by a displacement of scan lines of alternate fields developed from a single frame of optical film before the frame is recorded onto videotape, wherein said displacement decreases an image interlace error between adjacent images formed from groups of fields from different frames of a film image by introducing a scanning interlace error between fields in the groups from one frame.

2. A telecine chain as claimed in claim 1, wherein two of said fields are developed from each frame of the optical film.

3. A telecine chain as claimed in claim 1, wherein said de-strobe compensation is horizontal compensation and the displacement of said scan lines is effected by producing a leading or lagging store clock timing away from a standard reference timing with a variation in timing being equal to a rate of image movement between successive film frames.

4. A telecine chain as claimed in claim 1, wherein said de-strobe compensation is effected by defining one of said fields as being comprised of all even lines and another of said fields as being comprised of all odd lines, with a half-line rate square wave signal being used so that said fields are controlled independently.

5. A telecine chain in which optical film is continuously scanned, said telecine chain comprising:
   vertical de-strobe compensation being effected by displacement of scan lines of alternate fields developed from a single frame of optical film before said single frame is recorded onto videotape, said displacement comprising the step of displacing the scan lines of one field of a pair of fields by a distance equal to the distance between a full number of said scan lines for said field.

* * * * *